M. SHACHTMAN.
MOTOR DIRECTION INDICATOR.
APPLICATION FILED JULY 15, 1921.
1,428,663. Patented Sept. 12, 1922.
2 SHEETS—SHEET 2.
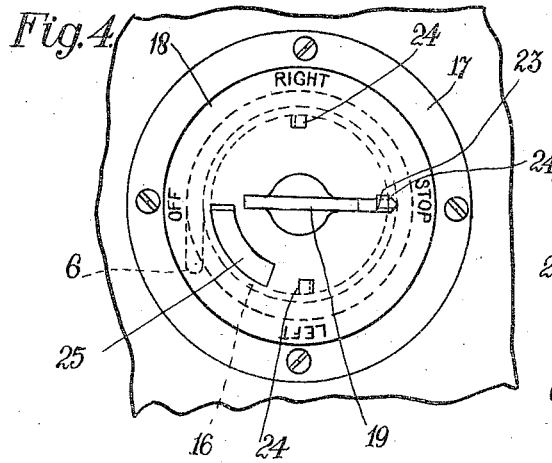
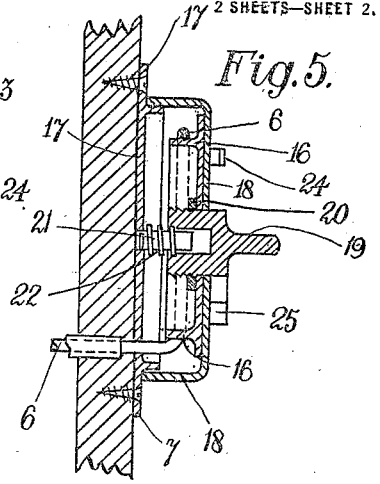
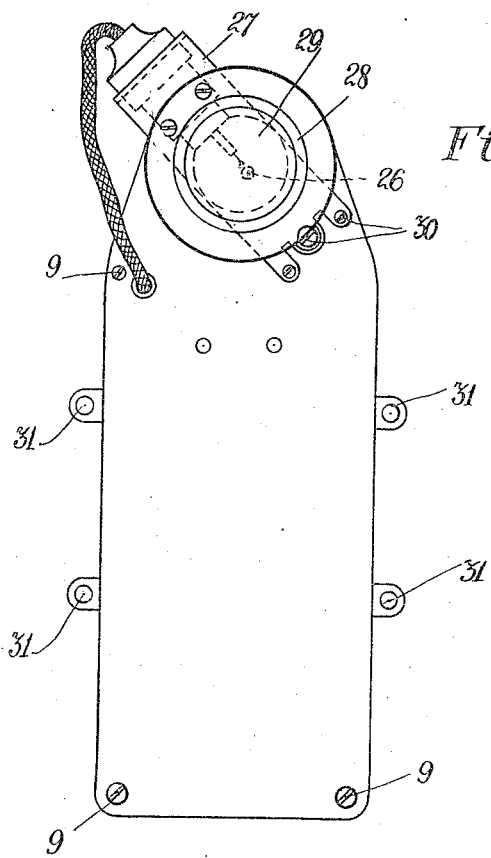
Inventor
Morris Shachtman
Per
Attorneys Patented Sept. 12, 1922.

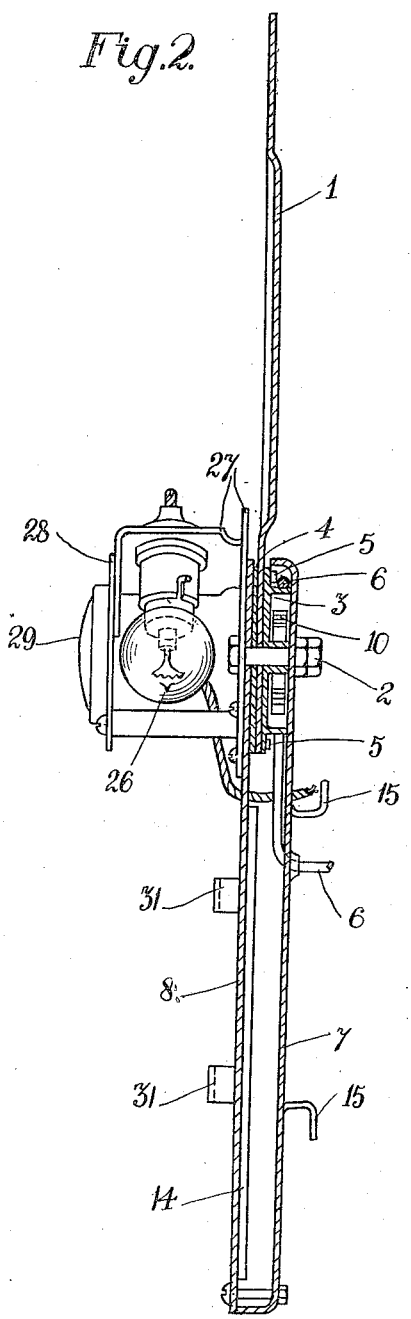
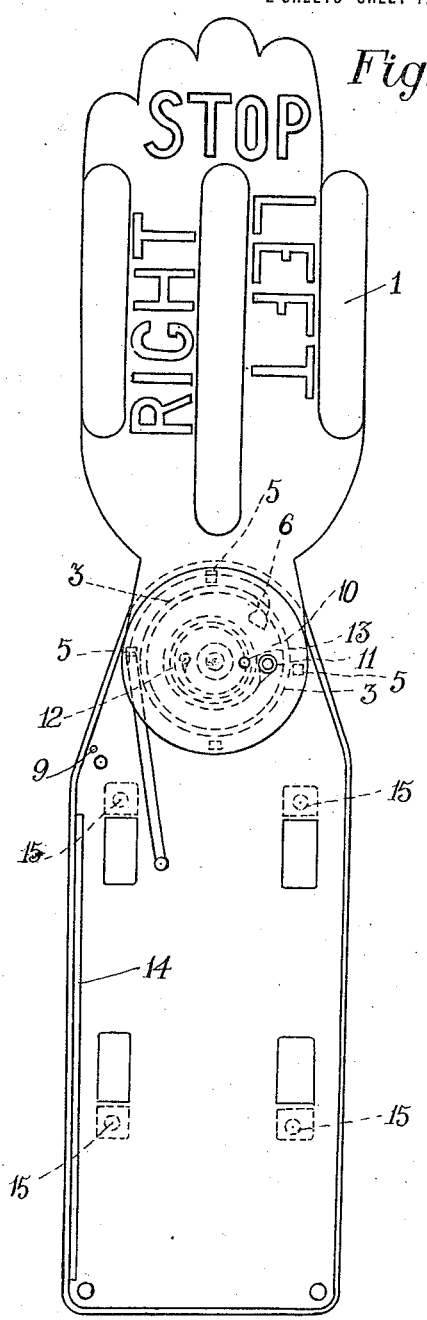

1,428,663

UNITED STATES PATENT OFFICE.

MORRIS SHACHTMAN, OF LONDON, ENGLAND.

MOTOR DIRECTION INDICATOR.

Application filed July 15, 1921. Serial No. 485,035.

*To all whom it may concern:*

Be it known that I, MORRIS SHACHTMAN, citizen of Russia, residing at 134 Brady Street Buildings, Brady Street, Whitechapel Road, London, in the county of London, England, have invented a new and useful Improvement in Motor Direction Indicators, of which the following is a specification.

This invention relates to signals or indicators primarily intended to be fixed at the back of, or in any other suitable position on a motor or other road vehicle to give a warning or indication to the drivers of vehicles in the rear, or to other users of the road that the vehicle to which the device is fixed is about to stop or change its course.

The invention essentially consists in providing an indicating device comprising a signal which can be turned into and held in various positions by means of a controlling switch adapted to be operated by the driver from his seat and connected to said signal by a Bowden wire, or other flexible connection so that the indicator may be readily fixed to any vehicle without necessitating any structural alteration therein.

Means are also provided whereby a framing adapted to carry an electric or other lamp for illuminating the signal at night and also serving as the rear light, may be secured to the indicating device. The invention also consists in certain details of construction which will be hereinafter described and pointed out in the claims.

In order that the invention may be clearly understood it will now be described with reference to the accompanying drawings which show, by way of example, one embodiment thereof. In the following description the invention will be described as applied to an automobile but it is to be understood that it may be equally well applied to any other type of vehicle.

Figure 1 is an elevation of the signal with the illuminating lamp and cover plate removed.

Figure 2 a longitudinal section.

Figure 3 an elevation with the illuminating lamp in position and the signal concealed.

Figure 4 an elevation of the controlling switch drawn to an enlarged scale, and showing the indicator locked.

Figure 5 a sectional elevation of the switch to an enlarged scale with the indicator released.

The signal consists of a plate 1 pivoted on a stud 2 and preferably shaped to represent a hand. On said plate are provided in any suitable manner the indications "Stop", "Right", and "Left" so arranged that they will be in the correct position for reading when the signal is turned to give the desired indication. The plate 1 is connected to a pulley 3 by means of a washer 4 provided with projections 5 which pass through correspondingly shaped slots in said plate and pulley and which are turned over and riveted to said pulley, alternate projections being turned in opposite directions. To the pulley 3 is secured a Bowden wire, or other flexible connection 6, which at its other end is connected to the controlling switch in the manner hereinafter described.

When not required to give an indication the signal is concealed within a trough-shaped casing 7 provided with a cover plate 8 secured to said casing by suitable studs 9. The outer end of a spiral spring 10 is secured to a pin 11 fixed to the pulley 3 and the inner end of said spring is attached to a pin 12 carried by the casing 7. In order to hold the spring 10 in place when, for any purpose it is desired to remove the washer 4, plate 1 and pulley 3 from the casing 7, a hole 13 is provided in said washer plate and pulley through which a loose pin may be passed. The trough-shaped casing 7 is provided with a strip of rubber 14 or other suitable material, forming a buffer for the signal when it is turned into its concealed position and with lugs 15 for bolting the indicator to brackets or suitable parts on the automobile and the cover plate 8 carries lugs or brackets 31 for the attachment of the number plate.

The controlling switch comprises a pulley 16 to which the flexible connection 6 is secured, enclosed within a casing formed of a base-plate 17 and a cover 18. An operating button 19 is screwed into the pulley 16 and locked in position by a lock nut 20. The button 19 and pulley 16 are free to move longitudinally on a guide pin 21 but are maintained in their outer position with said pulley bearing against the inside of the cover 18 by a spring 22. The button 19 has an extension forming a pointer 23 and the cover 18 is marked on the outside with indications such as "Off", "Right", "Stop", and "Left" corresponding to the different positions of the warning signal. At each of the indications "Right", "Stop", and "Left" is provided a stop 24 in the form of a hook and at the indication "Off" a rubber lined stop 25 against which the pointer bears when the signal is not in use being held in that position by the wire control 6 and the spring 22.

The controlling switch may be fitted on the steering column, or on the dashboard of the vehicle, or in any position, where it is readily accessible to the driver, the control wire 6 being carefully adjusted so that the slightest movement of the button 19 will produce a corresponding movement of the warning signal.

It is to be understood that the plate 1 may be provided with warning indicators other than those hereinbefore referred to, although the indications shown in Figure 1 are those most needed, and that the mechanism may readily be adapted to give more than three distinct indications if desired.

From the foregoing description the working of the apparatus will be apparent. The tendency of the spring 10, fitted as described is to uncoil and thus to maintain the signal concealed within the casing 7. The control wire 6 which projects through the casing 7 on being pulled by turning the button 19, causes the pulley 3 and consequently the signal to turn against the action of the spring 10, and project through the open top of said casing. The pulley 16 is of the same diameter as the pulley 3 and therefore if the pointer 23 is turned from say the "Stop" position through 90° to the indication "Left" on the cover 18 then the signal will be turned likewise through 90° from the position shown in Figure 1 to that in which the hand points to the left. If it is desired to retain the warning signal in any position, so that the driver's hands may be free, the button 19 is pressed inwards against the action of the spring 22 and the pointer 23 engaged by the hook 24. To release the signal the button 19 is turned to disengage the pointer from the hook 24 when, owing to the action of the springs 22 and 10 said pointer is immediately returned to the "Off" position and the warning signal concealed within the casing 7.

In order to illuminate the warning signal at night an electric or other lamp 26 carried by a framing 27 which may be readily carried by the stud 2 is provided and to said framing is secured a cover plate 28 having a red lens 29 serving as the rear light of the vehicle. The framing 27 may be adjusted by loosening the stud 2 and turning said framing into the desired position to which it is retained by screws 30 engaging tapped holes provided in the cover plate.

I claim:—

1. A direction indicator for motor vehicles comprising in combination a pivoted indicating plate provided with desired warning indications, a cover or shield behind which the pivoted plate is normally concealed, a pulley on the pivoted plate, a rotatable controlling switch placed conveniently to the driver and wholly flexibly connected to the indicator, stops for holding the switch in predetermined positions corresponding with the required positions of the pivoted indicating plate, a flexible cable, one end of which is connected to the controlling switch and the other end to the pulley on the pivoted plate, a coil spring arranged within the pulley on the pivoted plate and acting to normally hold the plate behind its shield or cover, a stop against which the pivoted plate bears when in the concealed position and hook shaped stops which hold and retain the pivoted plate in the indicating positions.

2. A direction indicator for motor vehicles comprising in combination a pivoted indicating plate provided with the desired warning indications, a cover or shield behind which the pivoted plate is normally concealed, a pulley on the pivoted plate, a controlling switch placed conveniently to the driver, stops to hold the pulley in predetermined positions corresponding with the required positions of the pivoted indicating plate, a flexible cable, one end of which is connected to the controlling switch and the other end to the pulley on the pivoted plate, an electric or other lamp mounted on the pivot of the indicator and a cover plate and red glass to act as the rear light of the motor vehicle.

MORRIS SHACHTMAN.